United States Patent [19]
Huie et al.

[11] Patent Number: 5,375,511
[45] Date of Patent: Dec. 27, 1994

[54] FOOD WARMER

[76] Inventors: Henry Huie, 4302 Paradise St., Vernon, Tex. 76384; Mathew Monzingo, 2625 Sunset Dr., Vernon, Tex. 76384

[21] Appl. No.: 73,696

[22] Filed: Jun. 9, 1993

[51] Int. Cl.⁵ .................... H05B 1/00; A47J 36/24
[52] U.S. Cl. ........................... 99/483; 34/209; 219/386; 219/411; 312/236; 392/416
[58] Field of Search ............... 99/467, 483; 34/201, 34/209, 231; 219/214, 386, 405, 411; 312/236; 392/416

[56] References Cited

U.S. PATENT DOCUMENTS

| | | | |
|---|---|---|---|
| 1,375,502 | 4/1921 | Giddings | 219/214 |
| 2,527,101 | 10/1950 | Maddox | 219/214 |
| 2,538,349 | 1/1951 | Bahnson | 312/236 |
| 2,577,184 | 12/1951 | Dietrich et al. | 219/405 |
| 2,600,294 | 6/1952 | Henry | 34/201 |
| 2,864,932 | 12/1958 | Forrer | 219/411 |
| 3,120,599 | 2/1964 | Hilgers | 219/214 |
| 3,327,092 | 6/1967 | Wilson | 312/236 |
| 3,855,451 | 12/1974 | Lee | 219/386 |
| 3,999,475 | 12/1976 | Roderick | 312/236 |
| 4,074,108 | 2/1978 | King | 219/214 |
| 4,119,834 | 10/1978 | Losch | 219/214 |
| 4,167,901 | 9/1979 | Wright | 99/483 |
| 4,343,985 | 8/1982 | Wilson et al. | 219/214 |

FOREIGN PATENT DOCUMENTS 2614436 10/1977 Germany ............... 219/411

*Primary Examiner*—David A. Scherbel
*Assistant Examiner*—Mark Spisich
*Attorney, Agent, or Firm*—Michael I. Kroll

[57] ABSTRACT

An improved food warmer is provided and consists of a cabinet having a chamber therein. A pair of doors are hinged to the front of the cabinet, so as to gain access into the chamber. A mechanism is for emitting heat into the chamber of the cabinet, so as to warm up food placed within the chamber.

7 Claims, 2 Drawing Sheets

FOOD WARMER

BACKGROUND OF THE INVENTION

1. Field of the Invention

The instant invention relates generally to heating devices and more specifically it relates to an improved food warmer.

2. Description of the Prior Art

Numerous heating devices have been provided in prior art that are adapted to hold previously cooked food quite near to preferred temperatures, for prolonged time periods by transferring heat to the food. While these units may be suitable for the particular purpose to which they address, they would not be as suitable for the purposes of the present invention as heretofore described.

SUMMARY OF THE INVENTION

A primary object of the present invention is to provide an improved food warmer that will overcome the shortcomings of the prior art devices.

Another object is to provide an improved food warmer that is used primarily in restaurants to watch chips, breads, rolls, crackers and other foods.

An additional object is to provide an improved food warmer in which heating lamps are suspended within a cabinet, so that food placed within the cabinet will be heated by the heating lamp, when a rheostat dial is properly adjusted to change the heat intensity of the heating lamps.

A further object is to provide an improved food warmer that is simple and easy to use.

A still further object is to provide an improved food warmer that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
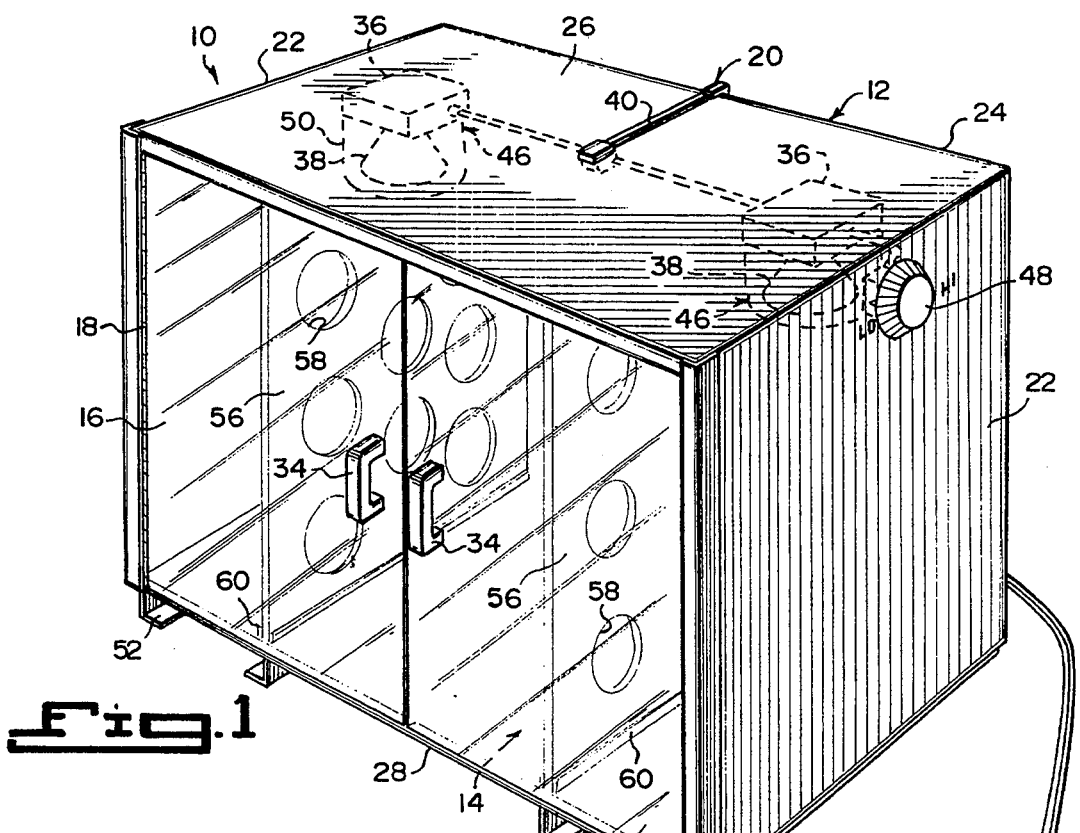
FIG. 1 is a perspective view of the instant invention with the transparent doors closed.
Figure 2:
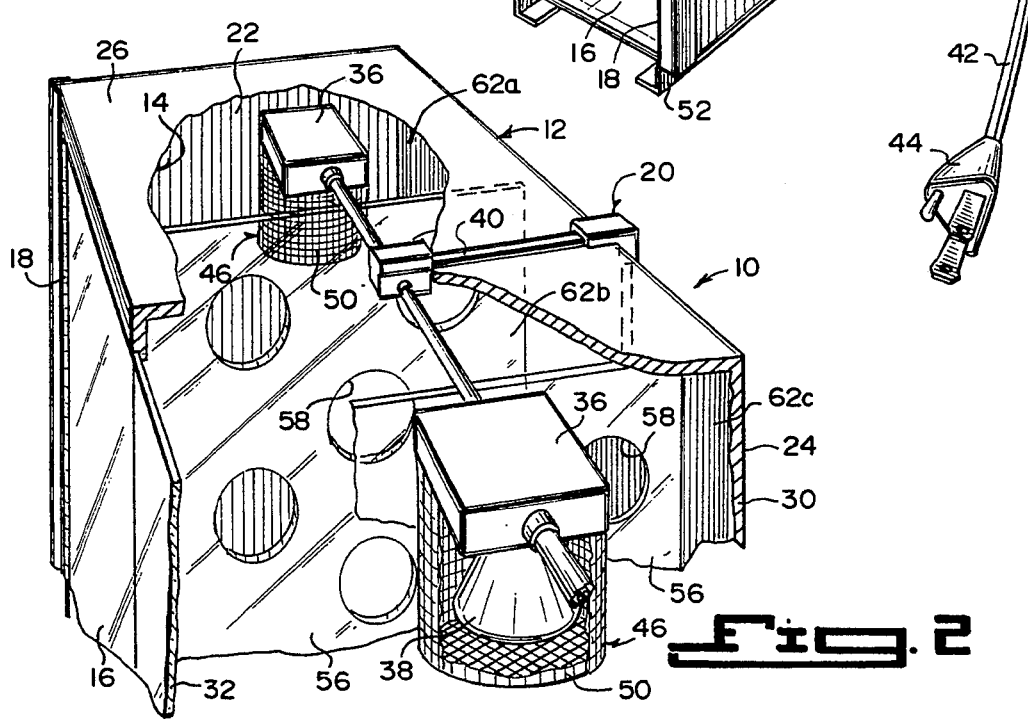
FIG. 2 is a perspective view thereof with parts broken away showing the heating lamps therein in grater detail.
Figure 3:
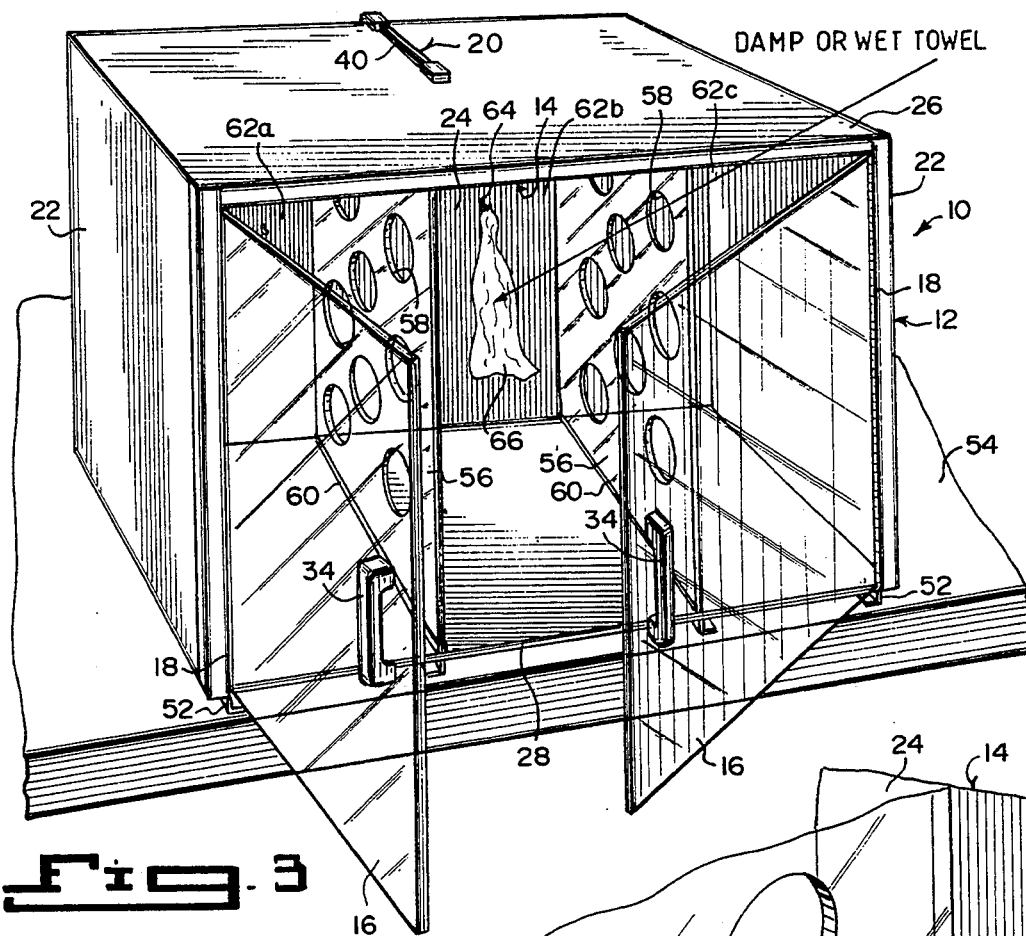
FIG. 3 is a perspective view of the instant invention sitting on a counter with the transparent doors partly opened.
Figure 4:
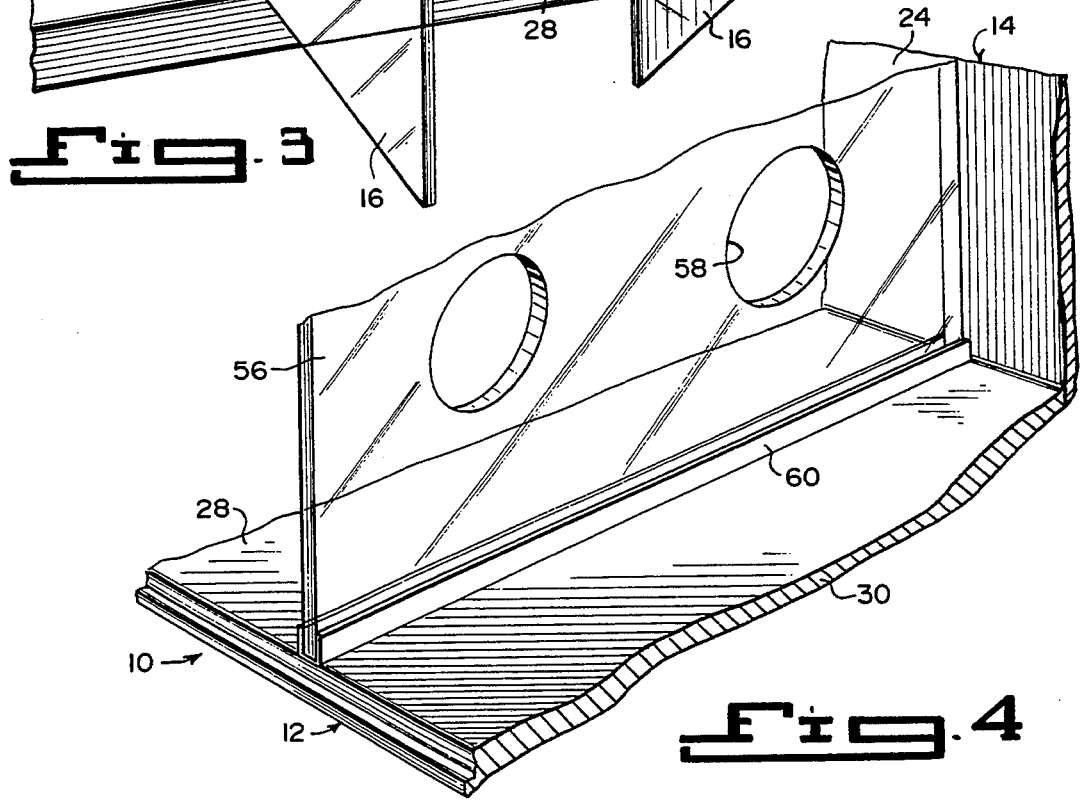
FIG. 4 is a perspective view of a portion thereof showing the track for one of the transparent dividers in greater detail.

Turning now descriptively to the drawings, in which similar reference characters denote similar elements throughout the several views, FIGS. 1 through 4 illustrate an improved food warmer 10, which consists of a cabinet 12 having a chamber 14 therein. A pair of doors 16 are hinged at 18 to the front of the cabinet 12, so as to gain access into the chamber 14. A mechanism 20 is for emitting heat into the chamber 14 of the cabinet 12, so as to warm up food placed within the chamber 14.

The cabinet 12 includes a pair of side walls 22, a rear wall 24, a top wall 26 and a bottom wall 28 defining the chamber 14. The cabinet 12 is fabricated out of aluminum metal material 30.

Each door 16 is fabricated out of transparent material 32, to allow a person to look into the chamber 14 without having to open the doors 16. Each door 16 further includes a handle 34 mounted thereon, so that a person can grip the handle 34 to easily open the door 16.

The heat emitting mechanism 20 consists of a pair of lamp sockets 36 spaced apart and mounted to the underside of the top wall 26 within the chamber 14 of the cabinet 12. A pair of heat bulbs 38 are provided, with each mounted into one lamp socket 36. A flat electrical conduit 40 extends between the lamp sockets 36, onto the upper surface of the top wall 36 and back to the rear wall 24 of the cabinet 12. An electrical cord 42 extends from the flat electrical conduit 40 at the rear wall 24 of the cabinet 12. A male plug 44 is on a distal end of the electrical cord 42 to engage with a female socket in a wall, to receive electrical current therefrom.

A structure 46 is connected to each lamp socket 36 for protecting the heat bulbs 38, so as to catch any broken glass from the heat bulbs 38 when damaged and prevent hands of a person from touching the heat bulbs 38 when hot. A rehostat 48 is carried on one of the side walls 22 and is electrically connected to the lamp sockets 36, so as to adjust the flow of electrical current into the lamp sockets 36, to change the temperature within the chamber 14.

The protecting structure 48 is a pair of screen shields 50, each surrounding each heat bulb 38. A plurality of legs 52 are mounted to the underside of the bottom wall 28 of the cabinet 12, to elevate and stabilize the bottom wall 28 above a flat surface 54, the cabinet 12 is placed upon.

A pair of partitions 56 are provided, with each being transparent and having a plurality of apertures 58 therethrough. A pair of tracks 60 are mounted to the bottom wall 28 within the chamber 14 of the cabinet 12 in spaced apart relationships, parallel with the side walls 22. The partitions 56 can slide within the tracks 60 to divide the chamber 14 into three compartments 62a, 62b, 62c, to hold different foods in each compartment. The lamp sockets 36 are located in the first and third compartments 62a, 62c.

A clip 64 is mounted onto the rear wall 24 within the second compartment 62b of the chamber 14 of the cabinet 12. A wet towel 66 can be hung on the clip 64, to introduce moisture within the chamber 14.

OPERATION OF THE INVENTION

To use the improved food warmer 10 the following steps should be taken:

1. Insert the male plug 44 on the electrical cord 42 into the female socket in the wall.
2. Open the doors 16 and place the food into the compartments 62a, 62b, 62c in the chamber 14 between the partitions 56.
3. Close the doors 16 and set the rehostat 48 to any setting between a LO and HI indication on the side wall 42.
4. When the food is warmed to its proper temperature, the doors 16 can be reopened and the food removed from the chamber 14 in the cabinet 12.

5. If moisture is needed, place the wet towel 66 onto the clip 64 attached to the rear wall 24 in the second compartment 62b. The moisture and heat will travel through the apertures in the partitions 56 to all areas of the chamber 14.

LIST OF REFERENCE NUMBERS.

10 improved food warmer
12 cabinet
14 chamber in 12
16 door
18 hinge
20 heat emitting mechanism
22 side wall of 12
24 rear wall of 12
26 top wall of 12
28 bottom wall of 12
30 aluminum metal material for 12
32 transparent material for 16
34 handle on 16
36 lamp socket
38 heat bulb
40 flat electrical conduit
42 electrical cord
44 male plug
46 protecting structure for 38
48 rehostat
50 screen shield
52 leg
54 flat surface
56 partition
58 aperture in 56
60 track on 28
62a first compartment in 14
62b second compartment in 14
62c third compartment in 14
64 clip
66 wet towel It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved food warmer which comprises:
    a) a cabinet having a chamber therein, said cabinet including a pair of side wall, a rear wall, a top wall, and a bottom wall and being fabricated out of aluminum metal material;
    b) a pair of doors hinged to a front of said cabinet, so as to gain access into said chamber, each said door being fabricated out of transparent material, to allow a person to look into said chamber without having to open said doors, each said door further including a handle mounted thereof, so that a person can grip said handle to easily open said door; and
    c) means for emitting heat into said chamber of said cabinet, so as to warm up food placed within said chamber, said heat emitting means including a pair of lamp sockets, spaced apart and mounted to an underside of said top wall within said chamber of said cabinet, a paid of heat bulbs, each mounted into a respective one said lamp socket, a flat electrical conduit extending between and connected to said lamp sockets, onto an upper surface of said top wall and back to said rear wall of said cabinet, an electrical cord extending from said flat electrical conduit at said rear wall of said cabinet, and a male plug on a distal end of said electrical cord to engage with a female socket in a wall to receive electrical current therefrom.

2. An improved food warmer as recited in claim 1, further including means connected to said lamp sockets for protecting said heat bulbs, so as to catch any broken glass from said heat bulbs when damaged and prevent hands of a person from touching said heat bulbs when hot.

3. An improved food warmer as recited in claim 2, further including a rheostat carried on one of said side walls and electrically connected to said lamp sockets, so as to adjust the flow of electrical current into said lamp sockets, to change the temperature within said chamber.

4. An improved food warmer as recited in claim 3, wherein said protecting means includes a pair of screen shields, each surrounding a respective heat bulb.

5. An improved food warmer as recited in claim 4, further including a plurality of legs mounted to an underside of said bottom wall of cabinet to elevate and stabilize the bottom wall above a flat surface, said cabinet is placed upon.

6. An improved food warmer as recited in claim 5, further including:
    a) a pair of partitions, each being transparent and having a plurality of apertures therethrough; and
    b) a pair of tracks mounted to said bottom wall within said chamber of said cabinet in spaced apart relationship, parallel with said side walls, so that said partitions can slide within said tracks to divide said chamber into three compartments to hold a different food in each compartment, whereby said lamp sockets are located in said first and third compartments.

7. An improved food warmer as recited in claim 6, further including a clip mounted onto said rear wall within said second compartment of said chamber of said cabinet, so that a wet towel can be hung on said clip to introduce moisture within said chamber.

* * * * *